(12) United States Patent
Drouot

(10) Patent No.: US 8,159,543 B2
(45) Date of Patent: Apr. 17, 2012

(54) PROCESSING DEVICE WITH JITTER EXTRACTION AND EQUIPMENT COMPRISING SUCH A DEVICE

(75) Inventor: Antoine Drouot, Paris (FR)

(73) Assignee: NXP B.V., Eindhoven (NL)

( * ) Notice: Subject to any disclaimer, the term of this patent is extended or adjusted under 35 U.S.C. 154(b) by 756 days.

(21) Appl. No.: 12/299,928

(22) PCT Filed: May 3, 2007

(86) PCT No.: PCT/IB2007/051649
§ 371 (c)(1),
(2), (4) Date: Nov. 7, 2008

(87) PCT Pub. No.: WO2007/132387
PCT Pub. Date: Nov. 22, 2007

(65) Prior Publication Data
US 2009/0219401 A1    Sep. 3, 2009

(30) Foreign Application Priority Data

May 9, 2006 (EP) .................................... 06300447

(51) Int. Cl.
*H04N 5/228* (2006.01)
(52) U.S. Cl. ............... 348/208.4; 348/208.1; 348/208.2; 348/208.13
(58) Field of Classification Search ............... 348/208.1, 348/208.2, 208.4, 208.13
See application file for complete search history.

(56) References Cited

U.S. PATENT DOCUMENTS

| 2003/0090593 A1 | 5/2003 | Xiong |
| 2004/0001147 A1 | 1/2004 | Vella et al. |
| 2005/0179784 A1* | 8/2005 | Qi .............................. 348/208.1 |

OTHER PUBLICATIONS

Ko, Sung-Jea, et al; "Fast Digital Image Stabilizer Based on Gray-Coded Bit-Plane Matching"; IEEE Transactions on Consumer Electronics, vol. 45, No. 3, Aug. 1999, pp. 598-603.
International Search Report for Int'l. Patent Appin. No. PCT/IB2007/051649 (Jan. 19, 2009).
Written Opinion for Int'l. Patent Appln. No. PCT/IB2007/051649.

* cited by examiner

*Primary Examiner* — Usman Khan

(57) ABSTRACT

A processing device (D) is dedicated to image frame stabilization of digital video sequences in an electronic equipment (E1), such as a digital camera, for instance. This processing device (D) comprises processing means (PM) arranged, for each current image frame of a video sequence, for determining a type of motion present in the video sequence from global motion parameters of the current image frame and the ones of at least one preceding image frame of this video sequence. These parameters are determined from a motion estimation between the current image frame and the preceding one of the video sequence. The motion determination is followed by a selection of a jitter extraction technique amongst at least two jitter extraction techniques depending on this determined motion type. The jitter extraction technique thus chosen is used to determine a jitter intended to be removed from the determined global motion parameter(s) in order to remove unwanted motion(s) present into the current image frame.

10 Claims, 1 Drawing Sheet

PROCESSING DEVICE WITH JITTER EXTRACTION AND EQUIPMENT COMPRISING SUCH A DEVICE

FIELD OF THE INVENTION

The present invention relates to the domain of digital image processing, and more precisely to the stabilization of digital image of video sequences.

BACKGROUND OF THE INVENTION

As it is known by the man skilled in the art, image stabilization algorithms have been proposed in order to remove unwanted camera movements or jitter while preserving the requisite camera movements, thus providing a more pleasant viewing experience. One means here by "unwanted camera movement or jitter" all the undesired positional fluctuation of an image, such as translation and/or rotation, which are added to the intentional motion of the camera.

In most of the digital image stabilization (or DIS) algorithms, three main steps are successively applied to the digital images of a video sequence. The first step consists in determining the motion estimation between two consecutive image frames (at time t and (t−1)) of the video sequence. The second step consists in determining the jitter of each image frame from the corresponding determined motion estimation. The third step consists in filtering (removing) the jitter from global motion parameters of each image frame in order to remove the unwanted motion(s).

Examples of such digital image stabilization algorithms are notably described in the patent documents US 2003/0090593 and US 2004/0001147. The first and third steps of these known digital image stabilization algorithms are easy to implement. Difficulties occur in the second step which aims at separating the unintentional motion(s) from the intentional one(s). Because of these difficulties, the algorithms offer either a weak stabilization of the static or quasi-static video sequences and a good (effective) following of panoramic/traveling video sequences, or a strong (effective) stabilization of the static or quasi-static video sequences and a jerky panoramic/traveling video sequences.

SUMMARY OF THE INVENTION

The object of this invention is thereforeto improve the situation at least partly, by adaptively adjusting the jitter extraction method depending on the type of motion present in a video sequence.

To this end, the invention relates to a processing device, for stabilizing image frame of a digital video sequence, comprising processing means arranged, for each image frame of a video sequence, for determining a jitter from global motion parameter(s) of this image frame, determined from a motion estimation between this image frame and the preceding one of the video sequence, and removing said jitter from the determined global motion parameter(s) in order to remove the unwanted motion(s) present into the image frame.

This processing device is characterized in that its processing means are arranged:

for determining a type of motion (which is present in the video sequence) from the determined global motion parameters of the image frame and the ones of at least one preceding image frame of this video sequence, then for selecting a chosen jitter extraction technique amongst at least two jitter extraction techniques depending on this determined motion type, and for using this chosen jitter extraction technique to determine the jitter.

The processing device according to the invention may include additional characteristics considered separately or combined, and notably:

its processing means may be arranged for selecting a chosen jitter extraction technique amongst at least a first jitter extraction technique adapted to strong stabilization of quasi-static video sequences and a second jitter extraction technique adapted to smooth following of panoramic video sequences;

its processing means may be arranged a) for computing a first sum of a chosen number K1 of determined global motion parameters of K1 consecutive image frames including the current one, and a second sum of a chosen number K2 of determined global motion parameters of K2 consecutive image frames including the current one, with K2<K1 (for instance K2=K1/2), then b) for comparing the signs of the first sums of these K1 consecutive image frames including the current one, then c) for comparing the sign of this first sum with the sign of the second sum, and then d) for associating either a first motion type associated to the first jitter extraction technique to the current image frame when the K1 first sums have different signs or both the K1 first sums have the same sign and the first and second sums have different signs, or a second motion type associated to the second jitter extraction technique to the current image frame when both the K1 first sums have the same sign and the first and second sums have identical signs;

its processing means may be arranged for computing, for each image frame representative of a scene, a first value representative of the real position of this scene into a chosen referential, then for computing a second value representative of an average of K1 determined first values of consecutive image frames including the current one, then for adding this first value average with said first sum to get a third value representative of a targeted position of the scene into the chosen referential, and then to compute the jitter corresponding to the current image frame by subtracting this third value corresponding to the current image frame from the first value corresponding also to the current image frame;

its processing means may be arranged for computing, for each image frame, a fourth value representative of the corrected position of the scene represented by the preceding image frame into the chosen referential, and a fifth value representative of the targeted position of the scene represented by the preceding image frame into the chosen referential, then for subtracting this fifth value from the fourth value to get a sixth value, and then for subtracting this sixth value from the jitter corresponding to the current image frame to get a corrected jitter to be removed from the determined global motion parameter(s);

its processing means may be arranged for computing, for each image frame, a seventh value representative of the corrected position of the scene represented by the current image frame into the chosen referential, then for subtracting the fourth value from this seventh value to get a eighth value representative of the corrected global motion parameter(s) of the current image frame, then for comparing the sign of this eighth value with the sign of the global motion parameter(s) or the second sum of the current image frame, and then either to use the computed jitter or corrected jitter of the current image frame when these signs are identical, or to use the computed jitter or corrected jitter of the preceding image frame when these signs are different;

K1 may be an integer smaller than or equal to a parameter value representative of the average frame rate of the video sequence;

it may comprise first computation means arranged for determining, for each image frame of the video sequence, the motion estimation between the current image frame and the preceding one of this video sequence, then for determining the global motion parameter(s) of the current image frame from the determined motion estimation;

it may comprise second computation means arranged for removing the jitter or corrected jitter from the determined global motion parameter(s) corresponding to the current image frame in order to remove the unwanted motion(s) present into this current image frame;

it may constitute at least a part of an integrated circuit.

The invention also provides a first electronic equipment comprising means for acquiring image frames of digital video sequences and a processing device such as the one above introduced. Such a first electronic equipment may be a digital camera or a communication equipment provided with video acquisition means, for instance.

The invention also provides a second electronic equipment comprising means for receiving image frames of digital video sequences to process and a processing device such as the one above introduced. Such a second electronic equipment may be a communication equipment or a digital video decoder or a digital video recorder or else a digital video encoder, for instance.

BRIEF DESCRIPTION OF THE DRAWINGS

Other features and advantages of the invention will become apparent on examining the detailed specifications hereafter and the appended drawings, wherein.

DETAILED DESCRIPTION OF THE INVENTION

Figure 1:
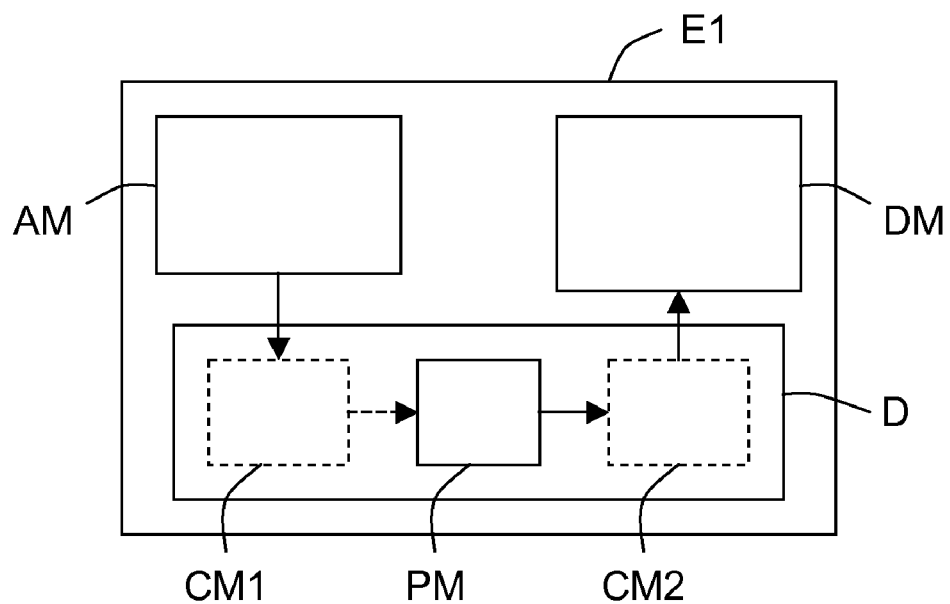
FIG. 1 schematically and functionally illustrates an example of embodiment of a digital camera comprising an example of embodiment of a processing device according to the invention, and FIG. 2 schematically and functionally illustrates an example of embodiment of a digital video recorder comprising an example of embodiment of a processing device according to the invention.

FIG. 1 illustrates an example of embodiment of a processing device D according to the invention. In this example, the processing device D is a part of an electronic equipment E1 which also comprises acquisition means AM provided for acquiring image frames of digital video sequences to process (i.e. to stabilize) and display means DM for displaying the processed video sequences. For instance, this electronic equipment E1 is a digital camera, but the invention is not limited to this type of acquisition equipment. Indeed, it may be also a communication equipment provided with video acquisition means, such as a mobile telephone or a personal digital assistant (PDA), for instance.

Figure 2:
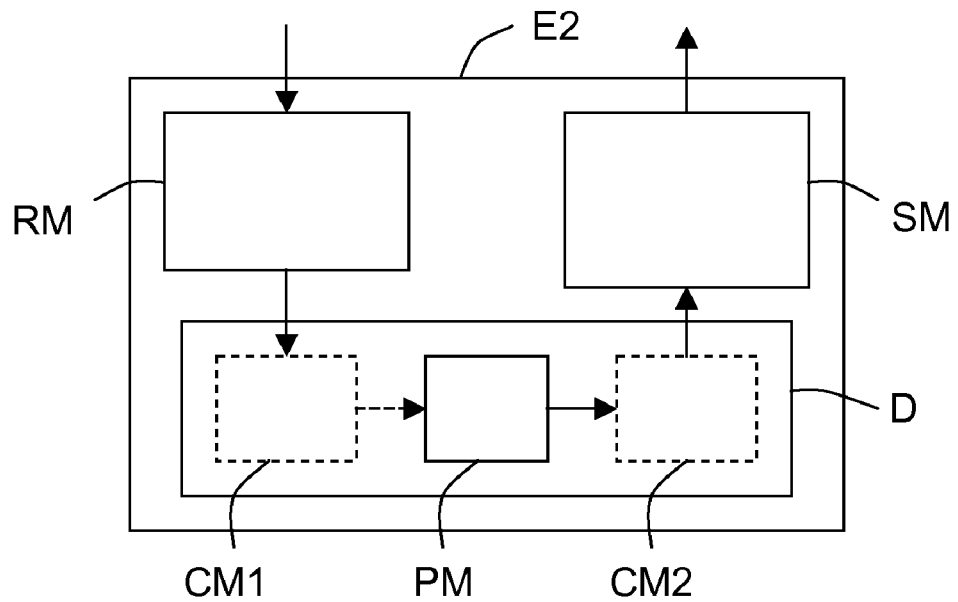

In a variant illustrated in FIG. 2, the processing device D is part of an electronic equipment E2 which also comprises data receiving means RM provided for receiving digital data representative of image frames of digital video sequences to process (i.e. to stabilize) and storing means SM for storing the processed video sequences at least temporarily. For instance, this electronic equipment E1 is a digital video decoder or a digital video recorder or else a digital video encoder adapted to be connected to a digital camera or a communication equipment or else to a communication network, but the invention is not limited to this type of receiving equipment. Indeed, it may be also a communication equipment, such as a mobile telephone or a personal digital assistant (PDA).

A processing device D according to the invention comprises at least a processing module PM arranged for determining (estimating) the jitter (or unwanted movement(s)) presents in almost every image frame of a video sequence. This jitter may be representative of a translation and/or a rotation.

To determine such a jitter, the processing module PM needs the so-called global motion parameter(s) of each image frame. A global motion parameter may be a global motion vector GMV or a rotation. Indeed, the jitter must be removed from the determined global motion parameter(s) of each image frame in order to remove the unwanted motion(s) it contains and therefore contribute to the video image stabilization. It is recalled that the successive values GMV(t) contain both the intentional motion and the unintentional (or unwanted) one (i.e. the jitter). Such GMVs are determined by a first computation module CM1 which may be part of the processing device D, as illustrated in FIGS. 1 and 2, or part of the electronic equipment E1 or E2 and coupled to the processing device D.

The first computation module CM1 is fed with digital data representative of image frames of digital video sequences to process (i.e. to stabilize) and classically arranged to determine, for each image frame of a video sequence, a motion estimation between this (current) image frame (at time t) and the preceding one (at time t−1), then to determine from this motion estimation global motion parameter(s) representative of the position difference of this image frame compared with the preceding one. Any technique known by the man skilled in the art may be used for outputting the GMV(s) of the image frames.

According to the invention, the processing module PM is arranged for determining, for each image frame of a digital video sequence, the type of its motion from the global motion parameters (GMVs and/or rotations determined by the first computation module CM1) of the current image frame and the ones of at least one preceding image frame of this video sequence. The processing module PM is also arranged for selecting one chosen jitter extraction technique amongst at least two jitter extraction techniques depending on the motion type it has determined for the current image frame, and finally for using this chosen jitter extraction technique to determine the jitter corresponding to the current image frame.

For instance, the processing module PM proceeds to its selection of the chosen jitter extraction technique amongst at least a first jitter extraction technique which is adapted to strong stabilization of static or quasi-static video sequences, and a second jitter extraction technique which is adapted to smooth following of panoramic video sequences.

In order to select a technique, the processing module PM may implement the four steps described hereafter. These steps are intended for determining whether the motion present into the current image frame corresponds to the motion of a static or quasi-static video sequence or to the motion of a panoramic (or traveling) video sequence.

The detection of panoramic frames is based on the monitoring of the GMVs of the input video sequence, which are outputted by the first computation module CM1. More precisely, it is based on the fact that in the case of a panoramic movement in an input video sequence, the motion is going in a unique direction, and therefore several consecutive GMVs have the same sign. However, due to the jitter present in the input video sequence, it is necessary to take into consideration several GMVs, so that unintentional jittery movements be smoothed out and not taken into account.

For this purpose, in a first step the processing module PM may compute a first sum S1(t) of a chosen number K1 of determined global motion parameters GMV(t) of K1 consecutive image frames of a video sequence, including the current one (time t), and a second sum S2(t) of K2 determined global motion parameters of K2 consecutive image frames of the same video sequence, including the current one, with K2<K1. The expression of S1(t) and S2(t) are given hereafter:

$$S1(t) = \sum_{k=0}^{k<K1} GMV(t-k),$$

$$S2(t) = \sum_{k=0}^{k<K2} GMV(t-k).$$

For instance one can choose K2=K1/2.

K1 is an integer which is preferably defined by the expression K1=(FR*RE)/1000, where "/" is the integer division, FR is the average frame rate of the input video sequence, and RE is a time constant (for instance expressed in milliseconds) which defines the reactivity of the computation in case of panoramic movements (i.e. the minimum time required for detecting a panoramic motion). The value of RE may be comprised, for instance, between 650 and 690, and is more preferably equal to 667 which is a value leading to a good compromise between stability and reactivity (but other RE values are possible). The higher the K1 value is, the less panoramic movements the algorithm will find.

In a second step the processing module PM compares the respective signs of the first sums S1(t−K1), S1(t−K1+1), S1(t−K1+2), ..., S1(t−1), S1(t) of the K1 consecutive image frames including the current one.

Then in a third step the processing module PM compares the sign of this first sum S1(t), corresponding to the current image frame, with the sign of the second sum S2(t), also corresponding to the current image frame.

Finally, in a fourth step the processing module PM uses the results of the two comparisons to determine the motion type of the current image frame. More precisely, three cases may occur:
  if the K1 first sums S1(t−K1), S1(t−K1+1), S1(t−K1+2), ..., S1(t−1), S1(t) have different signs, the processing module PM associates a first motion type, associated to the first jitter extraction technique, to the current image frame,
  if both the K1 first sums S1(t−K1), S1(t−K1+1), S1(t−K1+2), ..., S1(t−1), S1(t) have the same sign and the first S1(t) and second S2(t) sums of the current image frame have different signs, the processing module PM also associates the first motion type to the current image frame,
  if both the K1 first sums S1(t−K1), S1(t−K1+1), S1(t−K1+2), ..., S1(t−1), S1(t) have the same sign and the first S1(t) and second S2(t) sums of the current image frame have identical signs, the processing module PM associates a second motion type, associated to the second jitter extraction technique, to the current image frame.

So, the first motion type corresponds to a static or quasi-static video sequence while the second motion type corresponds to a panoramic (or traveling) video sequence.

Any first jitter extraction technique (adapted to strong stabilization of static or quasi-static video sequences) may be used and notably the two following ones that are described hereafter.

The first jitter extraction technique may start with a phase consisting in integrating the global motion vector GMV(t), representing the direction and magnitude of the motion of the current image frame at the instant t with respect to the previous image frame, with a damping coefficient a(E) which is a variable adaptive factor depending on an expression E, in order to output a modified vector IMV(t), called integrated motion vector, representative of the final motion vector correction to be applied to the current image frame in view of its motion correction. This integrated motion vector IMV(t) is given by the expression:

IMV(t)=a(t,t−1, ... )·IMV(t−1)+GMV(t), where IMV(t−1) is the integrated motion vector corresponding to the image frame preceding the current image frame.

The damping factor a(E) depends, for instance, on the sum of the two last global motion vectors GMV(t−1) and GMV(t). This allows to track the beginning of intentional motion (the last global motion vector GMV(t−1) being usually too instable to be used per se).

The correspondence table between the damping factor a(E) and the sum (GMV(t)+GMV(t−1)) of the two last global motion vectors may be built in the following way:
  a low sum of GMV values implies a high damping factor value, which strongly stabilizes the sequence, as if assuming static intentional camera;
  a high sum of GMV values implies a low damping factor value, and the sequence then follows more precisely the original motion.

Some additional features may be proposed. It is for example advantageous if one has a filtering on the x-vector independent of y-vector filtering. Moreover, an out of bounds detection may be provided: said detection allows to check if the IMV correction is not above a given threshold, corresponding to an extra input area authorized, and to correct it to stay within an allowed range, for instance +/−16 picture elements (or pixels).

Such a technique is an improvement of the one described into the document "Fast digital image stabilizer based on Gray-coded bit-plane matching", IEEE Transactions on Consumer Electronics, vol. 45, no 3, August 1999, pp. 598-603.

In a variant, the first jitter extraction technique may be provided for extracting a jitter which is not only of a translational nature, but also or only of a rotational nature. This variant requires specific global motion vectors GMVs which may be obtained as described hereafter.

The motion estimation phase is subdivided into three sub-stages:
  calculation and generation of so-called "Block Motion Vectors" (hereafter "BMVs") for specific parts of an image (corners, areas etc.) provided by a digital camera, for instance, said BMVs matching macroblocks between the current and the previous image,
  pruning of the BMVs for affine motion search, and resolution of a system of equations and determination of rejection criteria in order to obtain the global motion parameters (translation vector and rotation angle), representing the camera motion, derived from the BMVs.

The first sub-stage of BMVs generation comprises the four following steps.

The first step concerns the generation of a binary image frame.

"1 bit images" are used for motion estimation, because it considerably lowers the memory constraints, and moreover, the distortion function between reference and search blocks can be computed very efficiently. The distortion function, the "Sum of Absolute Differences" (hereafter "SAD") is calculated by using "XOR" operations that can be easily implemented. A "Gray-coded bit planes" decomposition of the image frame is used. Gray-coded bit planes are created as follows:

Let the luminance of the pixel at a location be represented as:

$$F_{lum}(x,y) = a_{N-1}2^{N-1} + a_{N-2}2^{N-2} + \ldots + a_k 2^k + \ldots + a_1 2^1 + a_0 2^0 \quad (1),$$

where x and y are coordinates of said plane and $a_k$, $0 \leq k \leq N-1$, is either 0 or 1. For example, to fix the ideas, in this case N=8 as 8 bit luminance images are used.

The $4^{th}$ Gray bit code $g_4$ is computed from the following equation:

$$g_4 = a_4 \oplus a_5 \quad (1bis),$$

where the symbol $\oplus$ represents the "eXclusive OR" operation and $a_k$ is the k-th bit of the "base 2" representation given by equation (1).

The $4^{th}$ Gray-coded bit plane image, or binary image frame, corresponding to the originally generated image frame (for instance by the acquisition means AM) is recorded into memory means.

The second step relates to block location and to a texture indicator.

Said binary image frame Img, for example representing a landscape, is divided, for instance, into six areas, A1 to A6, regularly distributed according to two parallel lines, on top and bottom of the image respectively. Each area, A1 to A6, contains, for instance, nine macroblocks (hereafter "MB") of 16×16 pixels (in the case of the format of image known as QCIF format of image).

Along with the binarization of the 8-bit image, a reliability measure is computed for each binary MB of the 1-bit image. Said measure is performed by simply counting the number of "1" pixels in the 16*16 pixels blocks. MBs that are too low textured, i.e. having too much or too little ratio of "1"s compared to "0"s, are labeled as unreliable and no motion estimation is performed on them. For example, some blocks are very homogenous and these blocks very often lead to wrong estimated Motion Vectors.

The third step concerns the block matching search strategy. Said strategy comprises the following sub-steps.

There is a variable number of Block Motion Vectors (BMVs) in an area, on which a full search block matching is performed.

Predictor and search range: To further simplify the number of candidate vectors in each area, only the first vector of each MB line will have an extended search area. The remaining blocks will have a reduced search window, centered on a predictor motion vector taken from the preceding reliable BMV. If the chosen neighbor is unreliable, the last valid MV is used as predictor (given the processing order left to right, top to bottom).

Rejection of probably unreliable MVs: A mechanism has been added for rejecting some probably unreliable Motion Vectors. Particularly in case of a light change, the motion search will produce a result, but this result may be completely wrong: the matched blocks are very different, and the resulting vector points more to the "less dissimilar block" than to the "most similar one". Therefore, it is chosen to reject MVs for which the SAD is above a certain threshold (here-after referenced as SAD_threshold).

Speed up the block-matching search: This threshold can also be used to speed up the Motion Search. Previously, the following mechanism was in place: for each MB search position, the current SAD was compared to the current minimum SAD every two lines in the MB. If it is already above it, the search, for this position, was stopped. Thus, by initializing current minimum SAD to the SAD_threshold, it becomes possible to further speed up the matching process.

The fourth step concerns sub-pixel motion estimation.

One way to perform a sub-pixel search is to interpolate the 8-bit image to create sub-pixel samples, and apply the binarisation process to this extended image. Then, the matching of binary extended images provides motion vectors with sub-pixel accuracy.

The second sub-stage consists in pruning the BMVs in order to perform an affine motion search.

From the previous step a set of BMVs has been obtained, that is a set of corresponding points between the current and previous images. To get the global affine motion parameters, this system is solved. With more than three pairs of corresponding points between two frames, the least square solution of the equation is obtainable, giving the global affine motion parameters. In order to get a reliable result, much more vectors are used (up to 54 vectors) thus creating an over-determined system.

However, the least-square algorithm is very sensitive to outliers, and removing them properly is a crucial step of the motion estimation process. This is done in three steps, described hereafter.

1. Removing more BMVs based on their SAD: Vectors whose SAD is above a certain threshold, hereafter SAD_threshold_low, are rejected (the threshold is of course lower than the one previously used in the "Motion Estimation").

2. Removing local outliers: the outliers are first removed locally for each area. There are six areas and up to nine vectors per area.

The process for one coordinate of the vector will be now explained, for example for x-coordinate. For each vector k (with $0 \leq k \leq$ number of valid vectors) in the area, the sum of the absolute differences sum_diff[k] is calculated from this vector to all the others (i) in the area, with:

$$\text{sum\_diff}[k] = \Sigma_i abs(\text{value}[k] - \text{value}[i]) \quad (2)$$

Then the following calculation is performed:

$$\text{average\_diff} = (\Sigma k \, \text{sum\_diff}[k])/\text{number\_of\_valid\_vectors} \quad (2bis),$$

where average_diff is the average of the sum of absolute differences over the area.

Finally, the rejection criteria sum_diff_[k] is as follows:

$$\text{sum\_diff\_}[k] > (\text{number\_of\_valid\_vectors}/\alpha) + \beta * \text{average\_diff} \quad (2ter),$$

where $\alpha$ and $\beta$ are predetermined thresholds.

This calculation is done independently on the x and y vector values. If any of the vector coordinates verifies the equation (2ter), then said vector is rejected.

3. Removing global outliers: The outlier rejection process done at the image level, using all the motion vectors, uses the same principle as the local one. The local step is necessary because some vectors would be able to create clusters at the global step and, thus, should be removed, if possible at the local level first. The global rejection allows removing outliers that are still remaining after the first phase, because the area have a very low number of vectors or contains moving objects that does not cope with the global motion. Threshold values α and β are less restrictive however in order to avoid rejecting too many vectors in case of high rotational motion for example.

The third sub-stage concerns the resolution of a system of equations and the determination of rejection criteria.

The over-determined system is solved (the first degree simultaneous equation is solved by Gauss-Jordan method). The system is:

$$X=ax+by+e$$

$$Y=cx+dy+f,$$

where x and y are coordinates of the binary images.

The least mean square solution gives the six parameters a, b, c, d, e and f Modeling the transformation of this system of equations as Translation (translation vector (Tx, Ty))+Rotation (rotation angle θ)+Zoom of the camera (scaling factor r), these equations correspond to:

$$X=r\cos\theta x - r\sin\theta y + Tx$$

$$Y=r\sin\theta x + r\cos\theta y + Ty$$

Therefore, the rotational angle θ is calculated while checking the consistency of the parameters a, b, c and d as given by the system resolution:

a first check is carried out to determine if the following equation is approximately satisfied:
$a^2+b^2=c^2+d^2$ (should both be equal to $r^2$), by rejecting results when $$(a^2+b^2)-(c^2+d^2)>\text{max\_diff\_zoom\_factor} \quad (3),$$

where max_diff_zoom_factor is a predetermined zoom parameter;

a second check is carried out to determine if the two equations produce approximately the same rotational angle, by rejecting results when:

$$|\theta_1-\theta_2|>\text{max\_angle\_difference} \quad (4),$$

where max_angle_difference is a predetermined rotation angle parameter, $\theta_1=\arctan(-b/a)$ and $\theta_2=\arctan(c/d)$.

Moreover, if a further predetermined rotation angle parameter, noted medium_angle_difference, matches the following equation:

$$\text{medium\_angle\_difference}<|\theta_1-\theta_2|<\text{max\_angle\_difference} \quad (4\text{bis}),$$

the smallest of the rotation angle found is selected as a value of θ.

If the results are considered consistent, one thus obtains both a translation vector (Tx=c, Tx=f) and a rotational angle θ given by $\theta=(\theta_1+\theta_2)/2$.

If the system resolution fails because either one of the equation (3) or (4) is true, the rotational angle is put to 0. For the translation vector, the median of the BMVs is taken (after the outlier removal process).

The motion filtering phase then follows the motion estimation phase. In this motion filtering phase the translation vector and the rotation angle are preferably filtered separately. Once the ideal correction in translation and rotation are found, a boundary check is performed. Thus said motion filtering phase comprises three main steps.

The first step consists in filtering the translation.

Separating the intentional motion from jitter in a consistent way over the course of a sequence is a complex problem. The main constraint, for a real-time application, is that not any delay is allowed, meaning that some frames cannot be stored in memory means and that a motion is better known. The filtering method for the translation vector is known per se, as already recalled.

Thus, it is not necessary to further detail such a method.

The second step consists in filtering the rotation angle vector.

The rotation angle is filtered in a different and simpler way because its variations are expected to be less erratic than the ones of the translation vector. The angles given by the motion estimation are accumulated over the sequence of images provided by the camera. The process tries to compensate them. Accumulated angles are calculated by summing all the rotation angles over the complete sequence, for example, at frame n:

$$(Acc\theta)[n]=\Sigma_{(1\leq k\leq n)}\theta[k]$$

The original accumulated angle is defined as the sum of the original rotational angles (as given by the motion estimation process). The corrected accumulated angle is defined as the sum of the corrected accumulated angle (after clipping due to the bound checking step, as described hereafter)

Usually, because of the bound checking step, compensating the full rotation angle is not feasible, or even desirable, if the user decides to voluntarily tilt the camera. When going back to the initial position, the new angular "fixed" position (corresponding to the corrected accumulated angle) could be slightly tilted compared to the original sequence. To avoid this, the original accumulated angle, as measured by the motion estimation, is stored and kept into memory means. If, for a certain number of consecutive frames, the corrected accumulated angle is too far from the original accumulated one, an extra correction is added to bring the corrected sequence back to a position closer to what the user desires.

The third step consists in bound checking.

During the "bound checking step" the "Rotation+Translation correction" (hereafter "R+T") is checked to determine if said correction is not above a predetermined allowed threshold, corresponding to an extra input area authorized. If so, "R+T" is further corrected to stay within the allowed range (for example, to fix the ideas, a border of ±8 pixels): the emphasis is put on the translation correction first (with a simulated extra area slightly smaller than the real one), then the rotational angle is clipped to stay within the allowed extra bounds of the image.

The detailed process is described hereafter.

First, the image frame F (here-after "frame") is translated (center of the frame goes from O to O'): translation vector VT. Given the position of the new center O', the frame F can only be rotated (frame F') until a certain angle that has to be calculated.

In the final frame creation process, the captor AM, for instance the one of a digital camera E1, produces a frame F with an extra area input Ai (border size equal to 1).

If the rotation angle to create the stabilized frame F' is too large, it should have a hole in the rotated frame.

The frame F comprises an inner rectangle ABCD which delimits the image which is shown to the user.

Now, it will be explained how the bound checking step works taking into consideration one of the corners of the cropped image (for example A, the top left one), but the process is identical for the other corners and has to be repeated for each of them. The goal is to calculate the limit angle for which the rotated image border intersects point A, taking into account the border size 1.

Going either clockwise or counter clockwise, there are two limit angles possible per considered corner.

Any angle is comprised between these two limit angles and will not lead to the creation of a hole (considering the corner A: again, this has to be checked for the remaining corners).

The first limit angle $\theta 1_A$ is calculated without generating a hole near the point A (first case) according to the equation:

$$\theta 1_A = \alpha 1_A - ArcCos((O'M)/L_A),$$

where $\alpha 1_A = ArcCos((nl/2 - 1 + Vy))/L_A)$, $L_A$ is the distance between the displaced center O' and the corner A (easily calculable from the frame size, border size 1 and translation vector VT), Vy is the γ value of vector VT and O'M=nl/2 (with np and nl being the captured frame F width and height, respectively).

The other limit angle $\theta 2_A$ is calculated without creating a hole near the point A (second case).

$$\theta 2_A = \alpha 2_A - ArcCos((O'N)/L_A),$$

where $\alpha 2_A = ArcCos((np/2 - 1 + Vx))/L_A)$, Vx is the x value of vector VT and O'N=np/2.

Thus, going through the four corners A, B, C and D, eight angles are obtained.

The minimum of the positive angles and the maximum of the negative angles are then calculated. The rotational angle as given by the motion estimation is clipped to one of these two final angles, if necessary.

Any second jitter extraction technique (adapted to smooth following of panoramic video sequences) may be used and notably the following one which is described hereafter.

The second jitter extraction technique aims at outputting, for each image frame of a video sequence, a jitter which can be removed from the global motion parameter(s) of the current image frame in order to allow it to follow the global movement of the input video sequence. The "average motion" of the input video sequence motion fulfills this requirement. So, the jitter must be computed as the difference between the current and real motion of an image frame and the desired averaged motion of this image frame.

In order to define the real and desired motions of a current image frame, one uses the so-called accumulated motion vectors or AMVs.

It is recalled that an AMV is a quantity that is often used in the context of DIS because it represents the position of the scene in a (fixed) referential. One means here by "scene" the entire field of view covered by the acquisition means AM, for instance of a digital camera E1, during a video sequence. If GMV(t) represents the position difference between the current image frame representing a scene at time t and the preceding image frame representing the same scene at time t−1, then AMV(t) represents the sum of the successive GMV since the beginning of the video sequence, and therefore the position of the scene in the referential.

The desired motion can be defined as a smoothed out version of the same AMVs (with a simple moving average filter).

One can show that the computation of the moving average introduces a shift. More precisely, at time t the average AMV represents the smoothed out position of the input video sequence at time t minus the period of the average, because the implementation constraint requires zero delay. Since the motion corresponds to a panoramic sequence, this shift can be quite large, depending on the speed of the acquisition means AM. So, if one subtracts directly the averaged motion from the measured motion, the shift and the jitter add up and thus lead to a quite large computed jitter. This computed jitter most likely exceeds the allowed limit (which may be for instance equal to 16 pixels for a CIF format), and stays clipped to this value. In this case one follows the motion, but not compensates any jitter.

So, to overcome this problem the motion must be extrapolated. To this effect one defines a (third) value desiredAMV(t) representative of the targeted position of a scene into a chosen referential, with the following expression:

$$desiredAMV(t) = \frac{1}{K}\sum_{k=0}^{k<K} realAMV(t-k) + S1(t),$$

where realAMV(t) is a (first) value representative of the real and measured position of the scene into the chosen referential, and S1(t) is the first sum previously defined (it represents the amount of motion that has been added to realAMV(t) since time (t−K)).

As long as the jitter has a roughly null expectation and the motion of the input video sequence corresponds to a panoramic/traveling of roughly constant speed, one may consider with a fairly good confidence that desiredAMV(t) has also been augmented of that quantity.

In order to compute the (third) value desiredAMV(t), the processing module PM first computes a first value realAMV(t) for each image frame of the video sequence, then a (second) value representative of the average of K1 determined first values of the K1 consecutive image frames including the current one, and finally it adds this first value average with the first sum S1(t) of the current image frame.

The processing module PM may obtain the jitter by subtracting directly desiredAMV(t) from realAMV(t): jitter(t) =realAMV(t)−desiredAMV(t), but it is advantageous to proceed in a different manner when one switches from the first jitter extraction technique to the second one. Indeed, in this case, an adjustment value [shift(t)] must be computed by the processing module PM in order to palliate the "jumps" generated into the output video sequence (i.e. the stabilized video sequence) each time one switches from the first jitter extraction technique to the second one. Thus, each time the processing module PM decides to switch from the first jitter extraction technique to the second one, it computes a (sixth) adjustment value shift(t) defined by the following expression:

shift(t)=correctedAMV(t−1)−desiredAMV(t−1), where correctedAMV(t−1) is a (fourth) value representative of the corrected position of the scene represented by the preceding image frame into the chosen referential (at time t−1), and desiredAMV(t−1) is a (fifth) value representative of the targeted position of the scene represented by the preceding image frame into the chosen referential (at time t−1).

Subsequent values of shift(t) stay constant as long as the jitter extraction technique is not changed by the processing module PM.

Finally, the processing module PM computes a corrected jitter defined by the following expression:

correctedjitter(t)=realAMV(t)−desiredAMV(t)−shift(t).

No adjustment is necessary when switching back from the second jitter extraction technique to a first one that computes the jitter taking into account its former values (as it is the case in the first jitter extraction techniques above described). Such an adjustment could however be necessary with other types of first jitter extraction technique.

Whatever the jitter extraction technique used, when a jitter or a corrected jitter has been computed by the processing module PM, a second computation module CM2 is provided for removing it from the corresponding global motion parameter(s) in order to remove unwanted motion(s) present into the current image frame. Such a second computation module CM2 may be part of the processing device D, as illustrated in FIGS. 1 and 2, or part of the electronic equipment E1 or E2 and coupled to the processing device D.

Before removing the jitter or corrected jitter from the corresponding global motion parameter(s), the processing module PM preferably checks if the corrected global motion parameter has the same sign than the current motion GMV(t). For this purpose, the processing module PM computes a (seventh) value correctedAMV(t) representative of the corrected position of the scene represented by the current image frame into the chosen referential, and then subtracts the (fourth) value correctedAMV(t−1) from this (seventh) value correctedAMV(t) to get a (eighth) value representative of the corrected global motion parameter of the current image frame.

Then it compares the sign of this eighth value (correctedAMV(t)−correctedAMV(t−1)) with the sign of the global motion parameter GMV(t).

This comparison can be expressed in pseudo-codes as follows:

$$GMV(t) \times (correctedAMV(t) - correctedAMV(t-1)) < 0.$$

If the signs are identical the processing module PM transmits the computed jitter (jitter(t)) or corrected jitter (correctedjitter(t)) of the current image frame to the second computation module CM2.

If the signs are different the processing module PM clips the corrected movement (at time t) to 0, which can be expressed in pseudo-codes as follows:

$$correctedAMV(t) \rightarrow correctedAMV(t-1)), \text{ and}$$

$$correctedjitter(t)[\text{or jitter}(t)] \rightarrow realAMV(t) - correctedAMV(t).$$

This type of comparison is liable of leading to stationery phases in the middle of a panoramic sequence each time a jitter occurs, and then to decrease the desired smoothness of the motion. So to avoid real counter-corrections (for instance if the panoramic stops or reverses its direction), the processing module PM can compare the sign of this eighth value (correctedAMV(t)−correctedAMV(t−1)) with the sign of the second sum S2(t). This second sum S2(t) being representative of a short-term average, it is more able to react to changes in the motion than the long-term average Si (t).

This variant of comparison can be expressed in pseudo-codes as follows:

$$S2(t) \times (correctedAMV(t) - correctedAMV(t-1)) < 0.$$

If the signs are identical, the processing module PM transmits the computed jitter (jitter(t)) or corrected jitter (correctedjitter(t)) of the current image frame to the second computation module CM2.

If the signs are different, the processing module PM clips the corrected movement (at time t) to 0, which can be expressed in pseudo-codes as follows:

$$correctedAMV(t) \rightarrow correctedAMV(t-1)), \text{ and}$$

$$correctedjitter(t)[\text{or jitter}(t)] \rightarrow realAMV(t) - correctedAMV(t).$$

Preferably, the processing device D constitutes at least a part of an integrated circuit IC. Such an integrated circuit may be realized in CMOS technology or in any technology currently used in chip factory. However, the processing device D may be also defined by means of software module(s) or a combination of hardware and software modules.

The invention is particularly advantageous in case of a real-time stabilization, i.e. when the frames cannot be stored in memory means and therefore must be immediately stabilized one after the other, without delay.

The invention is not limited to the embodiments of processing device and electronic device described above, only as examples, but it encompasses all alternative embodiments which may be considered by one skilled in the art within the scope of the claims hereafter.

The invention claimed is:

1. A processing device for image frame stabilization of a digital video sequence, comprising processing means provided, for each image frame of a video sequence, for determining a jitter from global motion parameter(s) of said image frame, determined from a motion estimation between said image frame and the preceding one of said video sequence, and removing said jitter from said determined global motion parameter(s) for removing unwanted motion(s) present into said image frame, characterized in that said processing means are arranged for determining a type of motion present in said video sequence from the determined global motion parameters of said image frame and the ones of at least one preceding image frame of said video sequence, then for selecting a chosen jitter extraction technique amongst at least two jitter extraction techniques depending on said determined motion type, and for using said chosen jitter extraction technique to determine said jitter wherein said processing means are arranged for selecting a chosen jitter extraction technique amongst a group comprising at least a first jitter extraction technique adapted to strong stabilization of quasi-static video sequences and a second jitter extraction technique adapted to smooth following of panoramic video sequences and wherein said processing means are arranged a) for computing a first sum of a chosen number K1 of determined global motion parameters of number of K1 consecutive image frames including the current one, and a second sum of K2 determined global motion parameters of K2 consecutive image frames including the current one, with K2<K1, then b) for comparing the signs of the first sums of said K1 consecutive image frames including the current one, then c) for comparing the sign of said first sum with the sign of said second sum, and then d) for associating either a first motion type associated to said first jitter extraction technique to the current image frame when said K1 first sums have different signs or both said K1 first sums have the same sign and said first and second sums have different signs, or a second motion type associated to said second jitter extraction technique to the current image frame when both said K1 first sums have the same sign and said first and second sums have identical signs.

2. A processing device according to claim 1, characterized in that K2 is equal to K1/2.

3. A processing device according to claim 1, characterized in that said processing means are arranged for computing, for each image frame representative of a scene, a first value representative of the real position of said scene into a chosen referential, then for computing a second value representative of an average of K1 determined first values of consecutive image frames including the current one, then for adding said first value average with said first sum of the current image frame to get a third value representative of a targeted position of said scene into said chosen referential, and then to compute the jitter corresponding to said current image frame by subtracting said third value corresponding to said current image frame from said first value corresponding also to said current image frame.

4. A processing device according to claim 3, characterized in that said processing means are arranged for computing, for each image frame, a fourth value representative of the corrected position of the scene represented by the preceding image frame into said chosen referential, and a fifth value representative of the targeted position of the scene represented by the preceding image frame into said chosen referential, then for subtracting said fifth value from said fourth value to get a sixth value, and then for subtracting said sixth value from said jitter corresponding to said current image frame to get a corrected jitter to be removed from said determined global motion parameter(s).

5. A processing device according to claim 4, characterized in that said processing means are arranged for computing, for each image frame, a seventh value representative of the corrected position of the scene represented by the current image frame into said chosen referential, then for subtracting said fourth value from said seventh value to get a eighth value representative of the corrected global motion parameter(s) of said current image frame, then for comparing the sign of said eighth value with the sign of said global motion parameter(s) of said current image frame, and then either to use said computed jitter or corrected jitter of said current image frame when said signs are identical, or to use said computed jitter or corrected jitter of the preceding image frame when said signs are different.

6. A processing device according to claim 4, characterized in that said processing means are arranged for computing, for each image frame, a seventh value representative of the corrected position of the scene represented by the current image frame into said chosen referential, then for subtracting said fourth value from said seventh value to get a eighth value representative of the corrected global motion parameter(s) of said current image frame, then for comparing the sign of said eighth value with the sign of said second sum of said current image frame, and then either to use said computed jitter or corrected jitter of said current image frame when said signs are identical, or to use said computed jitter or corrected jitter of the preceding image frame when said signs are different.

7. A processing device according to claim 6, characterized in that K1 is an integer smaller than or equal to a parameter value representative of the average frame rate of said video sequence.

8. A processing device according to claim 1, characterized in that the device comprises a first computation means arranged for determining, for each image frame of said video sequence, said motion estimation between said image frame and the preceding one of said video sequence, then for determining said global motion parameter(s) of said image frame from said determined motion estimation.

9. A processing device according to claim 8, characterized in that the device comprises a second computation means arranged for removing said jitter or corrected jitter from said determined global motion parameter(s) corresponding to a current image frame in order to remove the unwanted motion(s) present into said current image frame.

10. A processing device according to claim 9, characterized in that the device comprises at least a part of an integrated circuit.

* * * * *